United States Patent [19]
Greer et al.

[11] Patent Number: 6,009,429
[45] Date of Patent: Dec. 28, 1999

[54] HTML GUIDED WEB TOUR

[75] Inventors: Timothy Dan Greer, Endicott; William Francis Phillips, Owego; Will Joseph Roden, Jr., Apalachin, all of N.Y.

[73] Assignee: International Business Machines Corporation, Armonk, N.Y.

[21] Appl. No.: 08/969,623

[22] Filed: Nov. 13, 1997

[51] Int. Cl.$^6$ .................................................. G06F 17/30
[52] U.S. Cl. ................................ 707/10; 707/2; 707/501; 707/513; 709/218
[58] Field of Search .................................. 707/2, 10, 501, 707/513; 345/326, 335, 336, 357; 395/200.47, 200.48, 200.49; 709/218, 202, 229

[56] References Cited

U.S. PATENT DOCUMENTS

| | | | |
|---|---|---|---|
| 5,572,643 | 11/1996 | Judson | 395/793 |
| 5,701,451 | 12/1997 | Rogers et al. | 707/1 |
| 5,710,918 | 1/1998 | Lagarde et al. | 707/10 |
| 5,712,979 | 1/1998 | Graber et al. | 395/200.11 |
| 5,721,908 | 2/1998 | Lagarde et al. | 707/10 |
| 5,742,768 | 4/1998 | Gennaro et al. | 395/200.33 |
| 5,749,075 | 5/1998 | Toader et al. | 705/14 |
| 5,752,246 | 5/1998 | Rogers et al. | 707/10 |
| 5,794,259 | 8/1998 | Kikinis | 707/507 |
| 5,809,247 | 9/1998 | Richardson et al. | 395/200.48 |

OTHER PUBLICATIONS

Burke, Robin D. et al., "The Find Me Approach to Assisted Browsing", IEE Expert, vol. 12, Issue 4, Jul.–Aug. 1997, pp. 32–40.

Gilles, Jeff et al., "A Guided Tour Through a Window Oriented Debugging Environment for Embedded Real Time Ada Systems", Third International IEEE Conference on Ada Applications and Environments, 1998., May 23–25, 1988, pp. 93–103.

Johnson, Andrew et al., "Automatic Touring in a Hypertext System", Twelfth Annual International Phoenix Conference on Computers and Communications, 1993, Mar. 23–26, 1993, pp. 524–530.

"Virtual Guided Tour," Lauriston Girls School, Aug. 1996.

"Excite Launches a Web Tour Service," Web Week, vol. 2, Issue 16, Oct. 21, 1996, by Whit Andrews.

"Touring and Navigating a Global Learning Environment–the Web," Computer Networks and ISDN Systems, vol. 26, Suppl., No. 2–3, pp. S71–S74, 1994, by Crowcroft and Joly.

"JavaScript Sourcebook," by Gordon McComb (John Wiley & Sons, 1996).

"Browsing the WWW by interacting with a textual virtual environment," 7th ACM Conference of Hypertext 96, pp. 170–179, 1996, Mar. 1996, by A. Dieberger.

*Primary Examiner*—Wayne Amsbury
*Assistant Examiner*—Shahid Alam
*Attorney, Agent, or Firm*—Whitham, Curtis & Whitham; Arthur J. Samodovitz

[57] ABSTRACT

A guided tour of some portion of the World Wide Web (WWW) works as part of an ordinary web page, can be served by any web server, and can be used by web browsers without additional software. The system guides a user through a tour by displaying in sequence actual web pages in the tour along with a corresponding teaching web page. The teaching web page includes educational information about the current web page. The tour includes commentary, allowance for side trips, true visiting of the tour pages, not mere copies, maps, and "static" (user clicks for next page) and "dynamic" (a timer controls how long a tour page is on-screen) tours.

11 Claims, 8 Drawing Sheets

HTML GUIDED WEB TOUR

BACKGROUND OF THE INVENTION

1. Field of the Invention

The present invention generally relates to networked databases, such as the Internet, and, more particularly, to a computer implemented method of providing a user of the Internet with a guided tour of the World Wide Web (WWW) or similar information databases.

2. Background Description

The Internet is a collection of networks that allows users at disparate, heterogeneous computer systems to communicate with each other across organizational and geographical boundaries. The Internet uses a packet switched protocol referred to as the Transmission Control Protocol/Internet Protocol (TCP/IP). Full Internet access usually includes five key features; electronic mail (e-mail), logging on to Internet-connected computers using Telnet, transferring files from Internet-connected computers using File Transfer Protocol (FTP), getting access to discussion groups, and using various information-research tools, especially the World Wide Web (WWW). The present invention is particularly concerned with the World Wide Web.

The World Wide Web is a hypertext-based information service that makes collections of information available across the Internet. It allows Web browser clients to access information from any accessible Web server and supports multiple media types. The World Wide Web can be used to invoke other software by means of embedded hypertext links. Hypertext Markup Language (HTML) is used to describe static text documents, and a Web browser is essentially an HTML interpreter. A Uniform Resource Locator (URL) is basically a network location which tells the user not only where something is (its address), but also what it is. The basic form of a URL address is service://hostname/path which identifies what Internet service is needed to reach the resource, what computer it is located on, and enough detail to find what is being searched for.

Embedded hypertext links on a given Web page can be used to find information related to the given Web page. By clicking on a hypertext link in one Web page, the user can display another related Web page or even invoke a related program. With the explosion of information on the World Wide Web, there are many potential new users who would like to search for information on the World Wide Web. The problem is that there is no effective interactive system for guiding a user through a tour of the World Wide Web which uses actual Web pages.

There are three fairly obvious existing methods to guide a surfing session. One is simply to create an HTML file with commentary and links to the sites on the tour. Of course, in this case one must back up from each site to be presented with the next link. The second way is the web equivalent of simulation; i.e., make copies of all pages on the tour, save them on your own web page, and modify them as suits your purposes. A third way is similar to the second except more automatic; e.g., surf indirectly via a Common Gateway Interface (CGI) script which inserts modifications into the tour page before forwarding them to the end user.

SUMMARY OF THE INVENTION

It is therefore an object of the present invention to provide a guided tour of some portion of the World Wide Web which works as part of an ordinary web page, can be served by any web server, and can be used by web browsers without additional software.

It is another object of the invention to provide a World Wide Web tour in which commentary is incorporated into a regular web page and can include HTML formatting, graphics, applets, links, etc.

According to the invention, there is provided a system for guiding a user through a tour of the World Wide Web (WWW) on the Internet. The system displays an actual web page in the tour along with a teaching web page. The teaching web page may include educational information about the current web page and the WWW surfing process including an indication of the next page on the tour to be selected from the actual web page. The tour includes Commentary, Allowance for side trips, True visiting of sites, not just simulation, Maps, and "Static" (user clicks for next page) and "Dynamic" (a timer controls how long a tour page is on-screen) tours.

In the preferred embodiment of the invention, we split the web browser so that it fetches two (or more) pages at once. One page is the next page on the tour. The other page(s) is(are) the commentary for the tour page and the where-to-go-from-here information.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The preferred embodiment of this invention is implemented using the JavaScript programming language jointly developed by Sun Microsystems, Inc., and Netscape Communications, Inc. JavaScript is an object oriented programming language characterized by programs built of objects in which each object includes definitions of functions which may act on the object. These functions are referred to herein as JavaScript routines.

Figure 1:
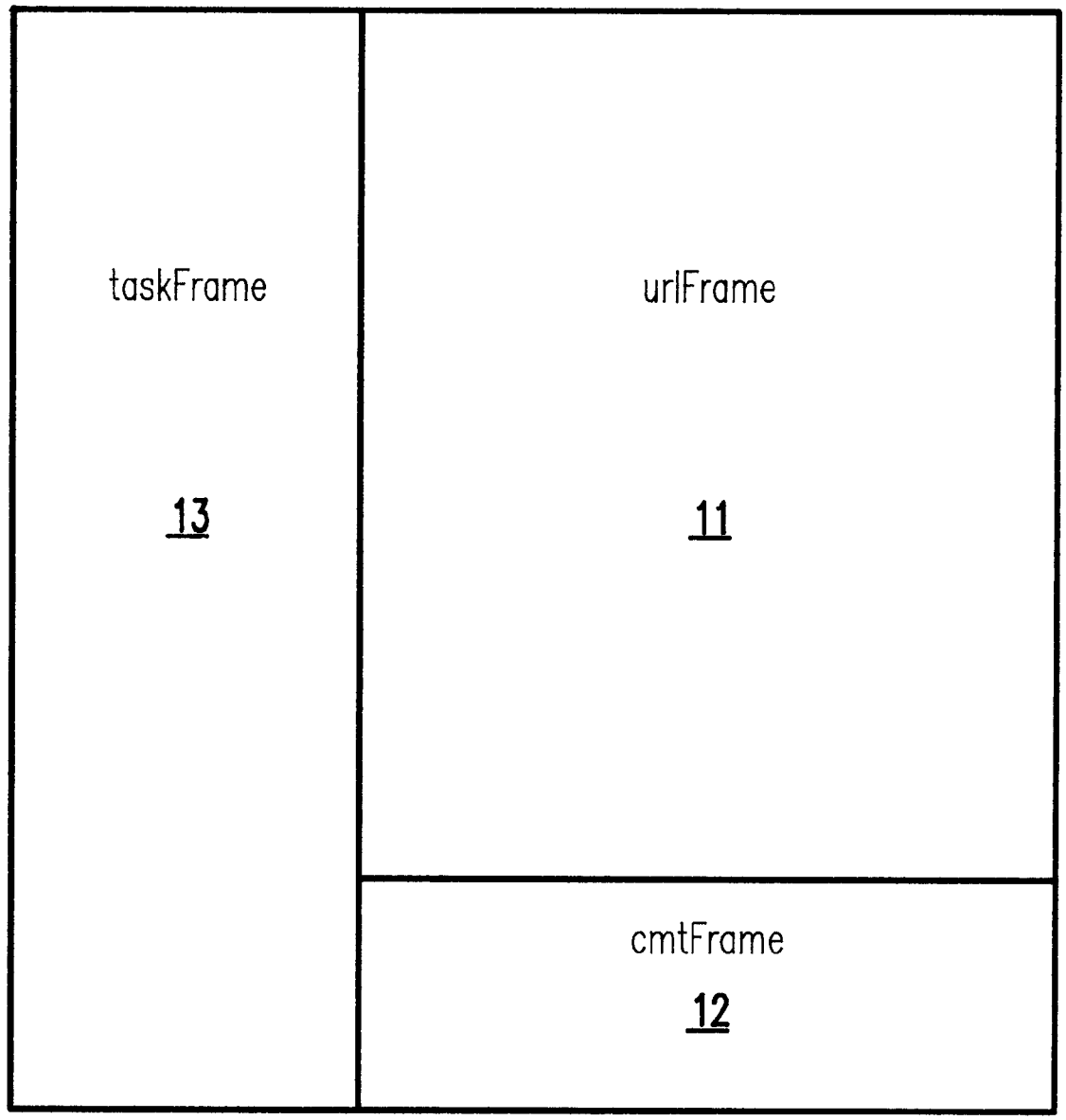
FIG. 1 is a diagram showing the layout of the screen into three frames in accordance with a preferred embodiment of the invention.

Referring now to the drawings, and more particularly to FIG. 1, there is shown a diagram of a computer screen on a client's computer, referred to herein as the browser's screen. The browser's screen is divided into three frames by the parent, initial frame. The large frame 11, referred to as the urlFrame, contains the referenced web site. Below the urlFrame 11 is another frame 12, referred to as the comment frame or cmtFrame, which contains the comments that were provided by the person compiling the tour. To the left of these frames is a third frame 13, referred to as the taskFrame, which contains the interface to operate the tour. This function could also be provided in the comment frame, in which case only two frames would be used.

An alternative user interface to accomplish the same thing would be to make only the tour frame visible, except overlay it according to directions from the third frame 13. For instance, we might overlay a circle around the link intended as the next hop on the tour, and pop up commentary windows based on mouse-over events. However, implementing this would require additional software on the client's workstation and, therefore, is not the preferred embodiment.

Figure 2:
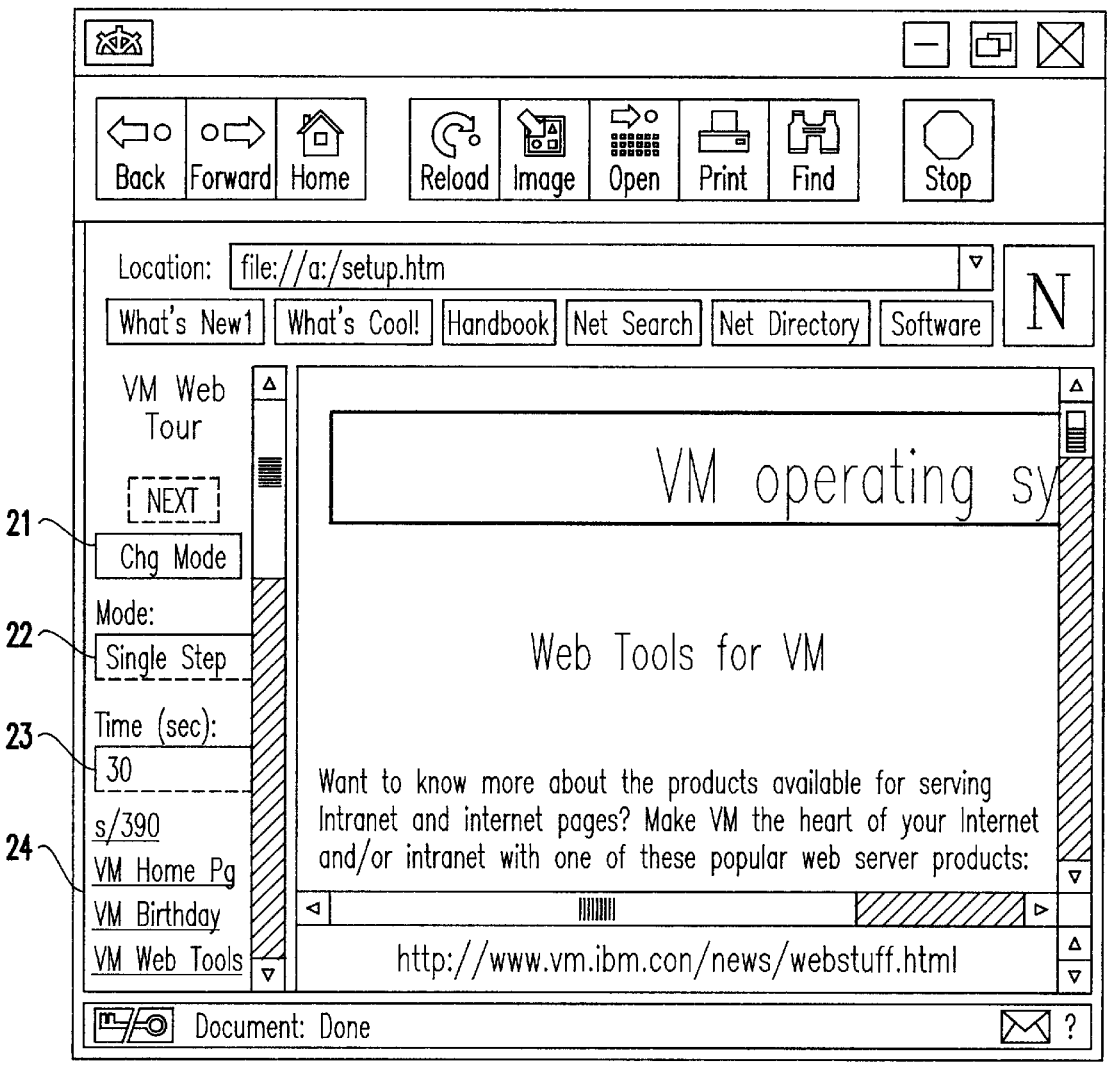
FIG. 2 is a screen print showing an example of a screen divided into three frames as defined in the diagram of FIG. 1.

FIG. 2 is a screen print of an example of the browser's screen divided according to the frames as shown in FIG. 1. In this example, the urlFrame 11 displays a Web site for International Business Machines (IBM) Corporation's Virtual Machine (VM) operating system. The comment frame or cmtFrame 12 provides comments about the Web site, in this case the address and content of the Web site. Finally, the taskFrame 13 provides the user interface to control the tour.

The JavaScript, which is running in the parent frame, controls the tour. It times the changes, changes the contents of the urlFrame 11 and comment frame 12, and it receives input from the user input in the taskFrame 13. A simple tour map is displayed at the bottom of taskFrame 13, showing a short title of each tour stop ("S/390", "VM Home-Page", etc.). The tour route could be displayed as an edge/node network, using color to indicate main route, side trips, user's path and current location, etc. This would belong in a pop-up window.

To start the tour, the user points his or her browser at "http://www. . . . /Start.HTM", where ". . ." is the URL address of the Web site desired. The starting HTML file contains all of the JavaScript routines, both of the arrays defining the tour, and all of the global variables. It divides the screen into the three frames, urlFrame, cmtFrame and taskFrame.

The main function of this invention is to present several guest Web sites in a specific sequence. We refer to these Web sites as "tour web pages" and present them in the urlFrame. When this frame is initially presented, a BLANK HTML is written into this frame. BLANK HTML just consists of "<html><head></head><body></body></html>". Later, in the initialization process, this frame will be filled with the first guest Web site.

The commentary about the guest Web site is placed in the cmtFrame. We refer to these Web sites as the "comment web pages". One of these HTML files can be generated for each guest Web site presented or a generic one may be used. When the frame is initially presented, BLANK HTML is written into this frame; however, it will be filled in with the first comment html later in the initialization process.

The html, Task.HTM, that is written into the taskFrame writes the initial values of the customizing arrays and variables in the parent frame. There are two arrays, one with a list of URLs containing "tour web pages" and the other with a list of the URLs of the "comment web pages". Typically, the "tour web pages" are full URLs, and the "comment web pages" are relative URLs and reside on the web site with the Start.HTM and the Task.HTM. Variables are needed to indicate how many elements are in the arrays, the default mode, and the default display time. Each new application requires a new taskFrame, that is, a new Task.HTM. This frame also contains the controls for the Web Tour. As shown in FIG. 2, there is a "change mode" push button 21 that will change the mode the Web Tour is using from "run" to "single step" or back. The current mode is displayed in an input box 22 which, in this example, is "single step". Another input box 23 contains the delay time that will be used when in "run" mode before the next page will be requested. The remainder of the frame 24 contains direct links to each stop on the tour. This gives the user a map and allows the user to jump to any location on the tour.

To implement these functions, four JavaScript functions have been written. These are "displayI( )", "displayN( )", "stopTimer( )", and "chgMode( )". These are illustrated by way of the flow diagrams of FIGS. 3 to 6, respectively. The arrays are "tourPages", a list of "tour web site" URLs, and "comment", a list of "comment web site" URLs. The global variables are the following:

pageCount—the number of pages to be displayed and the number of valid entries in the arrays.

next—the next page to be displayed.

step—step mode (1) or run mode (0).

timerOn—timer on (1) or off (0).

timerH—the handle for the currently running timer.

Figure 3:
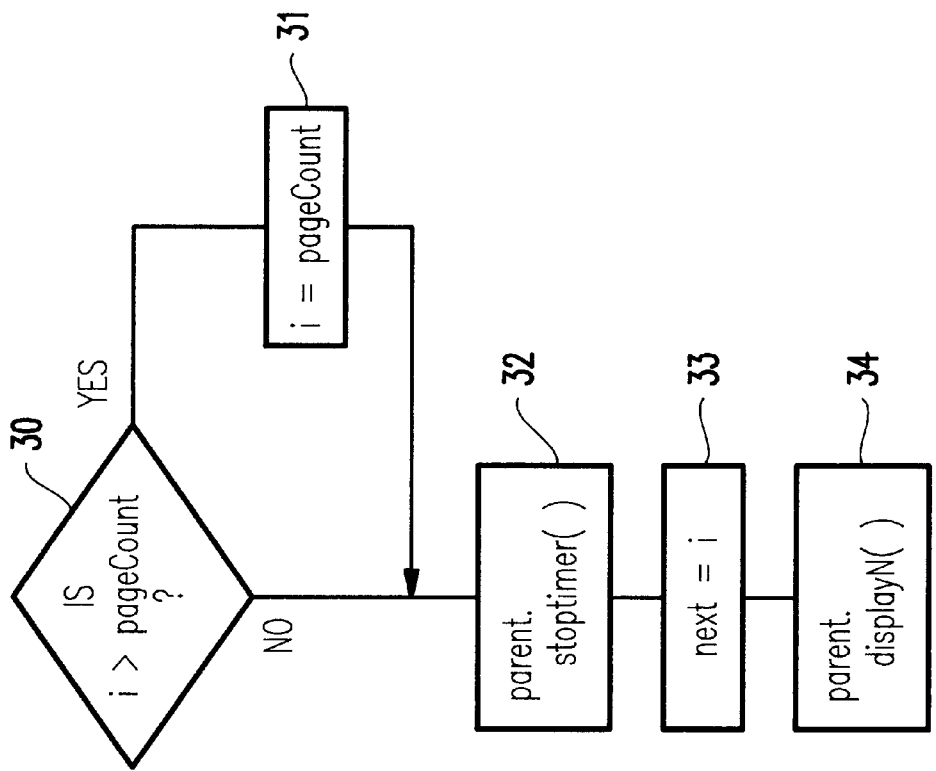
FIG. 3 is a flow diagram showing the logic of the display a specific page function according to the invention.

Referring now to FIG. 3, the flow diagram for the JavaScript "displayI(i)" routine is shown. The purpose of this JavaScript routine is to display a specific page, now. The argument is the index of the arrays to be displayed (i), where i is the input argument for the page to be displayed. The process begins in decision block 30 where a test is made to determine if i is greater than pageCount. If so, i is set to equal pageCount in function block 31; otherwise or after setting i equal to pageCount, the parent.stoptimer( ) function is executed in function block 32. The parent.stoptimer( ) function is the stop timer function illustrated in FIG. 5. It turns off a countdown timer whose expiration causes displayN( ), shown in FIG. 4, to be executed. The next page is set to i in function block 33, then the parent.displayN( ) function is executed in function block 34. The parent.displayN( ) function is the display function which replaces whatever is in urlFrame with the web page indicated by tourPages(next), replaces whatever is in cmtFrame with the web page indicated by comment(next), and increments the global variable "next". If in the "run" mode, the parent.displayN( ) function starts the countdown timer whose expiration will cause the displayN( ) function to again be executed.

Figure 4:
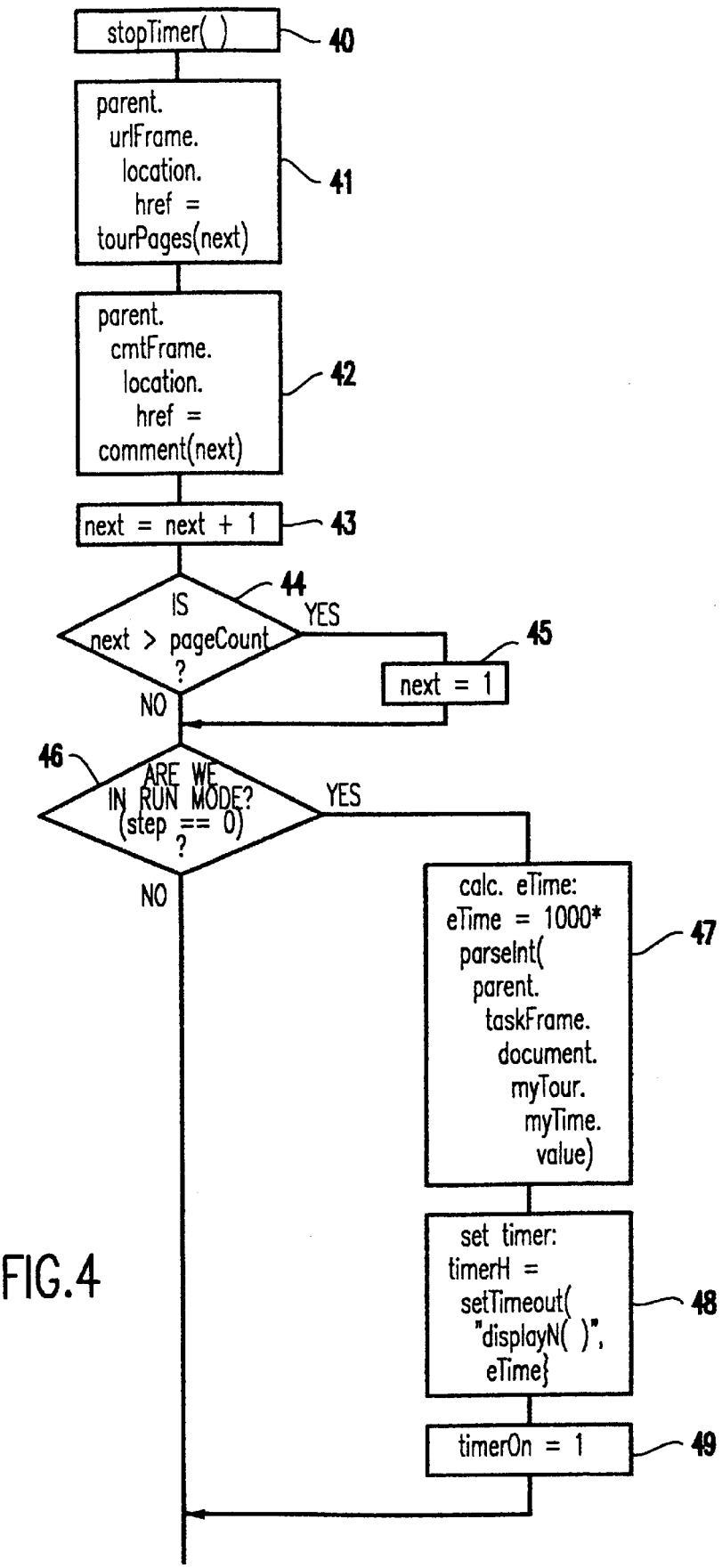
FIG. 4 is a flow diagram showing the logic of the display a next page function according to the invention.

Referring next to FIG. 4, there is shown the flow diagram from the JavaScript displayN( ) routine which displays the page indicated by the "next" variable. The local variable is "eTime" which is the event time or the number of seconds as obtained from the input box of the taskFrame converted to the number of JavaScript timer events (e.g., sec*1000). The stopTimer( ) function is executed in function block 40 to start the process. Then, in function block 41, the parent.urlFrame.location.href is set to tourPages(next) which replaces whatever is in urlFrame with the web page indicated by tourPages(next). This followed in function block 42 by setting the parent.cmtFrame.location.href to comment (next) which replaces whatever is in cmtFrame with the web page indicated by comment(next). The next argument is incremented by one in function block 43, and then a test is made in decision block 44 to determine if the next argument is greater than pageCount. If so, next is set to one in function block 45; otherwise or after setting next to one, a test is made in decision block 46 to determine whether the process is in the run mode. If so, the event time is calculated in function block 47, the timer is set to the event time in function block 48, and the timer is turned on in function block 49.

Figure 5:
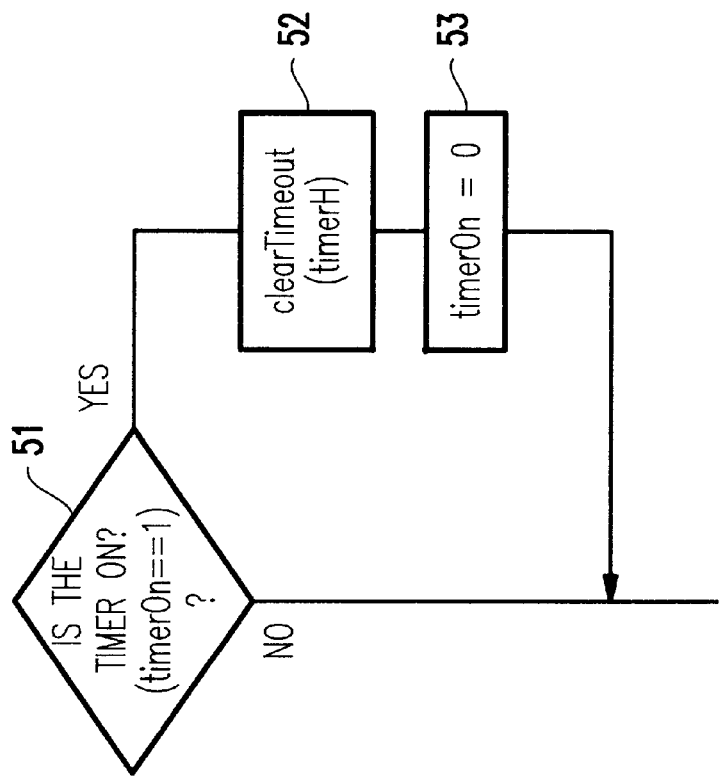
FIG. 5 is a flow diagram showing the logic of the stop timer function according to the invention.

Referring next to FIG. 5, the flow diagram for the JavaScript stopTimer( ) routine is shown. The purpose of this routine is to stop the timer if it is running. The process begins in decision block 51 to determine whether the timer is on. If no, the time out period is cleared in function block 52, and the timerOn value is set to zero in function block 53.

Figure 6:
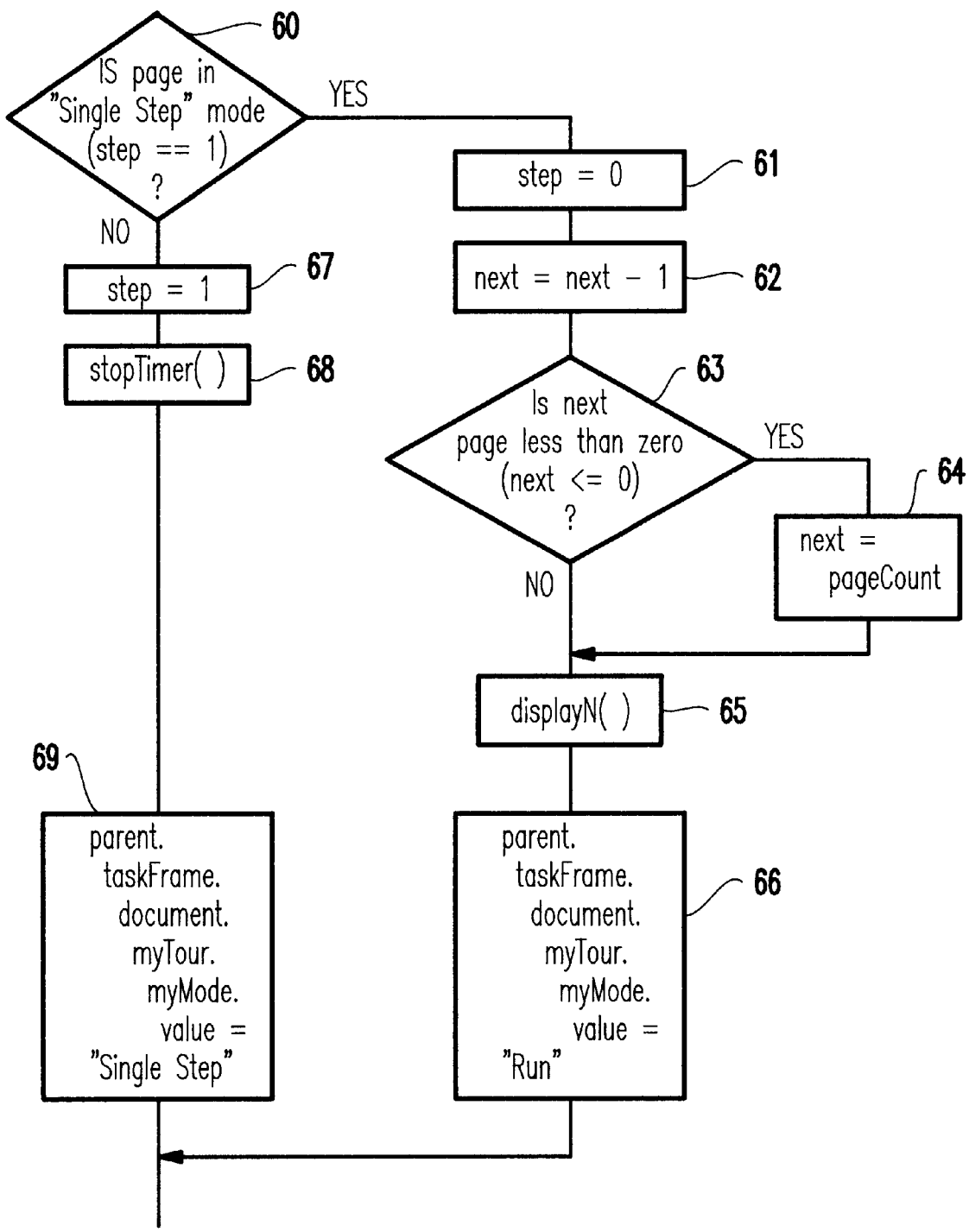
FIG. 6 is a flow diagram showing the logic of the toggle function for switching between run mode and single step mode according to the invention.

The flow diagram for the JavaScript chgMode( ) routine is shown in FIG. 6. The purpose of this routine is to toggle between the run mode and the single step mode; that is, if the page is in the run mode, it is placed in the single step mode, but if it is in the single step mode, it is placed in the run mode. The process begins in decision block 60 where a test is made to determine if the page is in the single step mode. If so, the mode is toggled to run mode in function block 61, and next page is decremented by one in function block 62. A test is then made in decision block 63 to determine if the next page is less than zero. If so, the next page is set to pageCount in function block 64; otherwise or when next page is set to pageCount, the displayN( ) routine (FIG. 4) is called in function block 65. The parent.tastFrame.document.myTour.myMode.value is set to run in function block 66. This sets the tour mode to "run", which causes new pages to be loaded periodically, as controlled by the "eTime" variable by means of the timer without further user intervention (i.e., no clicks required).

Returning to decision block 60, if the page is set in run mode, it is toggled to single step mode in function block 67, and the stopTimer( ) function (FIG. 5) is called in function block 68. The parent.taskFrame.document.myTour.myMode.value is set to single step in function block 69. This sets the tour mode to "single step" mode, requiring the user to click on the "next" button in the taskFrame in order to move to the next stop on the tour.

Figure 7:
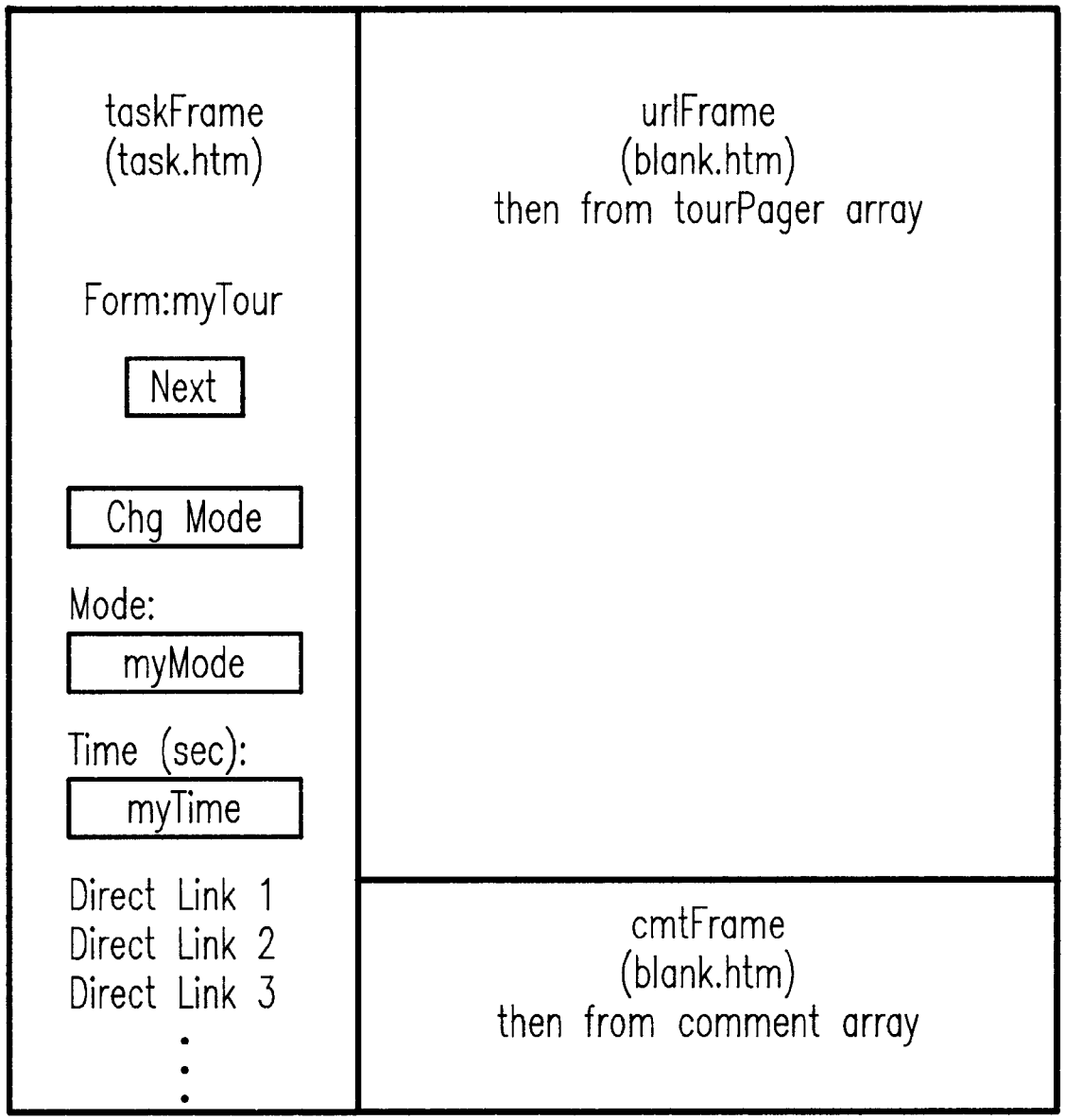
FIG. 7 is a diagram similar to FIG. 1 illustrating how the several functions implemented by the invention are used.

FIG. 7 provides an illustration of how the functions of FIGS. 3 to 6 are used. When Start.HTM is loaded, the two arrays, tourPages and comment, are initialized. As mentioned above, tourPages is the list of "tour web site" URLS, and comment is the list of "comment web site" URLS. The several global variables are also initialized at this time. These are pageCount, next, step, timerOn, and timerH, as described above. The three frames, taskFrame, urlFrame and cmtFrame, are created, and Task.HTM is loaded into taskFrame, BLANK.HTM is loaded into urlFrame and BLANK.HTM is loaded into cmtFrame. When Task.HTM is loaded into taskFrame, document.myTour.myMode.value is set to run, parent.timerOn is set to zero, document.myTour.myTime.value is set to thirty (a default value), the direct links are set up as anchor tags, and the JavaScript displayI(1) routine is run. When displayI(1) is run, the first element in the tourPages array is loaded into the urlFrame and the first element of the comment array is loaded into the cmtFrame. When "next" is pressed, the JavaScript displayN( ) routine is run. When "Chg Mode" is pressed, the JavaScript chgMode( ) routine is run. When one of the direct links is clicked, the JavaScript displayI(x) routine is run where x is the number of the Web tour page to be loaded.

An aspect of the invention is the provision for automatic creation of a tour based on a user's free-ranging web surfing. One way to accomplish this is to surf indirectly. A CGI script acts as the proxy fetching and forwarding pages to the surfer and also creating the "taskFrame" information for each page as a new page it selected. The commentary could either be added later or returned from a separate is browser window via a fill-out form. A less thorough but more easily implemented automatic tour creation method would be to send the information in the history variable to a CGI script which would then create the tour.

The "Web Guided Tour" applies to several aspects of education, marketing, and other types of communication. It can be a tool that allows a person's favorite web pages to be displayed along with comments that were added by the person creating the web tour. This provides a way to introduce a visitor to a specific web site and to provide more information than can be displayed on an initial web page. For example, a web site could display several applications that demonstrate features of a product or several ways that the product could save a customer money. To obtain this information, the web visitor would just click on the link to the tour.

The invention can also be used for education by taking the user on a tour of web sites and asking the user questions about each one. The questions and a space to answer them would be in the comment area. Before the next web site is selected, the answers to the questions would be submitted to the teacher for grading.

If a projection unit is attached to the computer (as is commonly used for transparencies), the web lesson could be presented to an entire class. This would supplement current distance learning techniques. An advantage of this technique is the author of the referenced web pages would be able to keep their own information up to date.

When the web data resides on a disk drive instead of the web, the invention allows an automated slide show, providing the ability to do Kiosk type continuous demonstrations. This would be useful at a demonstration booth or in a mall. The customer's ability to manually guide the tour allows the customer to focus the tour on areas of interest to them.

Finally, when the web distribution of sound and video become more popular, this could be used to present movies that are guided by the user.

The invention may be practiced in various alternative embodiments. For example, the frame 13 shown in FIG. 1 could be divided into two frames. The first frame could consist of the controls "Next", "Chg Mode", "Mode", and "Time". The second frame would then contain the direct links. This would allow the direct links to be loaded from arrays and then viewed while keeping the controls visible. Implementation of this would require a third array to contain the text shown in the list. A default comment frame could be created for frame 12 that would contain and load the URL for the frame displayed in the URL frame 11.

Figure 8:
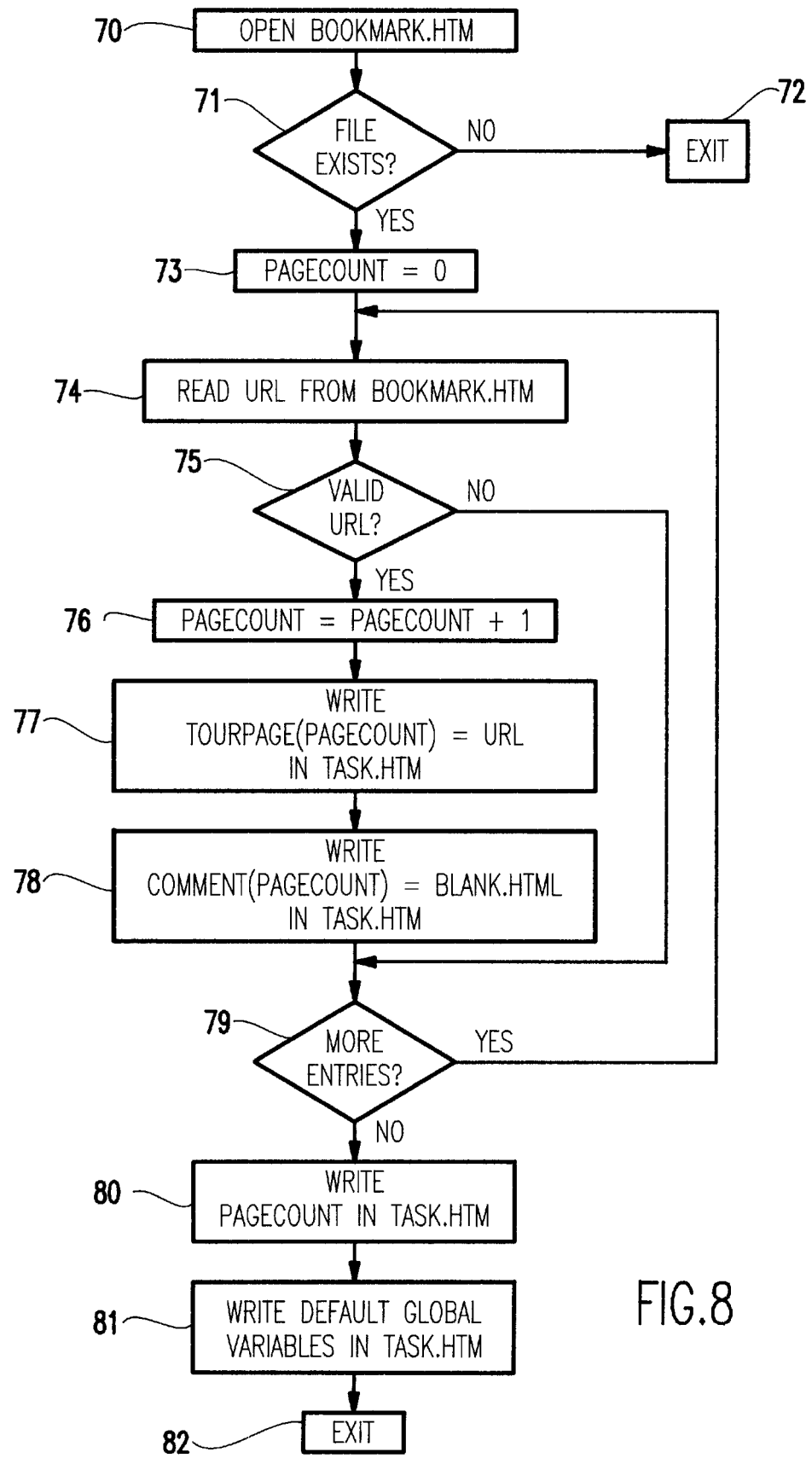
FIG. 8 is a flow diagram showing how a browser's hotlist can be used to generate a guided tour.

Another automatic method for crating a tour would be to use the browser's "hotlist" or "bookmarks" to provide the list of tour pages. In this implementation, a standalone program processes the user's bookmark.htm to generate the Task.HTM file. A flow diagram for this program is shown in FIG. 8. In function block 70, the program attempts to open the user's bookmark.htm file. A test is made in decision block 71 to determine if the file exists and, if not, the program exits at function block 72. If the bookmark.htm file does exist, the "pageCount" variable is initialized to zero in function block 73. The first URL is read from bookmark.htm in function block 74 and tested for validity in decision block 75. If the URL is not valid, the program jumps to block 79 and tests for more entries.

If the URL is valid, the "pageCount" variable is incremented in block 76 and the URL is written out to Task.HTM into the tourPages array in function block 77. Function block 78 writes the BLANK.HTML into the comment array since, as this tour is being generated from the user's "hotlist", there are no comments to add to the tour.

Decision block 79 tests bookmark.htm for more is entries and, if more are present, the program loops back to function block 74. If no more entries are present, then the program writes the "pageCount" variable into Task.HTM in function block 80. The program also writes the default values for the global variables "next", "step", "timerOn", and "timerH" in to Task.HTM in function block 81. The program then exits at function block 82. the user can now load Start.HTM and use Task.HTM to run a tour of "hotlist" pages.

Figure 9:
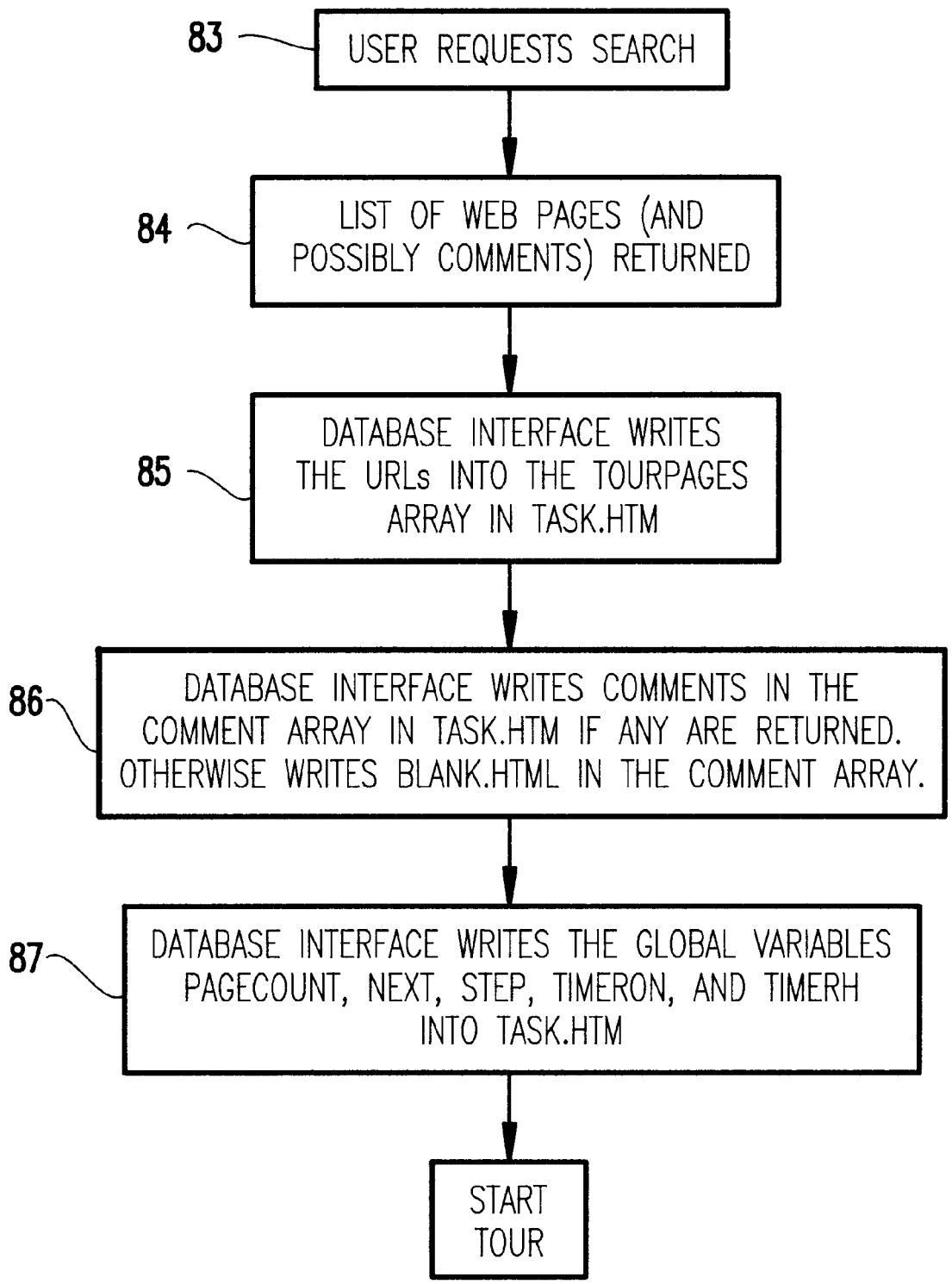
FIG. 9 is a flow diagram showing the steps involved in presenting the output of a database search as a guided tour.

Output from database searches can also be used to provide a list of pages for a tour. In this case, the database interface must be designed to return a list of found web pages in the same format as Task.HTM. A block diagram of a typical implementation of this method is shown in FIG. 9. In block 83, the user requests a search that will result in a list of web pages returned from a database. In block 84, the list of pages and, depending on the database, comments are returned. In block 85, the database interface writes the list of URLs out as the tourPages array in Task.HTM. In block 86, the database interface writes the comments into the comment array if any comments were returned along with the URLs. Otherwise, BLANK.HTML is used as the default comment. In block 87, the database interface writes out the number of pages returned as the global variable "pageCount" as well as default values for "next", "step", "timerOn", and "timerH". In block 88, the database interface launches the tour of the returned pages.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer implemented method for providing a guided tour of some portion of the World Wide Web (WWW) as part of an ordinary web page comprising the steps of:

initializing an array of tour web site Uniform Resource Locators (URLs);

initializing global variables including a number of pages to be displayed and a next page to be displayed, wherein the global variables initialized further include a display mode and a display timer;

creating a first frame for displaying a web page and a second frame for displaying controls for the guided tour;

calling a first routine from the second frame to access the array of tour web site URLs and display a specific page of a Web site in the first frame;

calling a second routine from the second frame to access the array of tour web site URLs and display a next page of a Web site in the first frame;

calling a third routine from the second frame to change a mode of display of pages in the first frame between a run mode and a single step mode, and when in the single step mode turning the display timer off;

initializing an array of comment web site URLs;

creating a third frame for displaying comments; and accessing the array of comment web site URLs to display a comment corresponding to a displayed Web page in the first frame.

2. A computer implemented method as recited in claim 1, further comprising the steps:

querying a user in said third frame for displaying comments;

accepting responses to said queries; and storing said responses for later retrieval.

3. A computer implemented method as recited in claim 1, wherein said third frame for displaying comments may be used for Hyper Text Mark-up Language (HTML) formatting, graphics, applets, media complements, and links.

4. A computer implemented method for providing a guided tour of some portion of the World Wide Web (WWW) as part of an ordinary web page comprising the steps of:

initializing an array of tour web site Uniform Resource Locators (URLs);

initializing global variables including a number of pages to be displayed and a next page to be displayed, wherein the global variables initialized further include a display mode and a display timer;

creating a first frame for displaying a web page and a second frame for displaying controls for the guided tour;

calling a first routine from the second frame to access the array of tour web site URLs and display a specific page of a Web site in the first frame;

calling a second routine from the second frame to access the array of tour web site URLs and display a next page of a Web site in the first frame; and calling a third routine from the second frame to change a mode of display of pages in the first frame between a run mode and a single step mode, and when in the single step mode turning the display timer off;

wherein when in run mode, further receiving input from a user adjusting a time period of the display timer which calls the second routine to access the array of tour web site URLs and display a next page of a Web site in the first frame.

5. A computer implemented method for providing a guided tour of some portion of the World Wide Web (WWW) as part of an ordinary web page comprising the steps of:

initializing an array of tour web site Uniform Resource Locators (URLs);

initializing global variables including a number of pages to be displayed and a next page to be displayed, wherein the global variables initialized further include a display mode and a display timer;

creating a first frame for displaying a web page and a second frame for displaying controls for the guided tour;

calling a first routine from the second frame to access the array of tour web site URLs and display a specific page of a Web site in the first frame;

calling a second routine from the second frame to access the array of tour web site URLs and display a next page of a Web site in the first frame; and calling a third routine from the second frame to change a mode of display of pages in the first frame between a run mode and a single step mode, and when in the single step mode turning the display timer off;

wherein said array of tour web site URLs comprises entries stored on a user's workstation.

6. A computer implemented method as recited in claim 5, wherein said tour web site URLs are selected from said user's "bookmarks".

7. A computer implemented method as recited in claim 5, wherein said tour web site URLs are selected from said user's web browser "history" file.

8. A computer implemented method as recited in claim 5, wherein said tour web site URLs are selected from results of a database search performed by said user.

9. A computer implemented method as recited in claim 5, wherein said tour web site URLs are selected from a list created by a history of free-ranging web surfing by said user.

10. A computer implemented method as recited in claim 5, further comprising the steps of:

initializing an array of comment web site URLs;

creating a third frame for displaying comments; and accessing the array of comment web site URLs to display a comment corresponding to a displayed Web page in the first frame.

11. A computer implemented method as recited in claim 10, further comprising the steps of:

accepting input from a user, adding commentary to said third frame for displaying comments;

storing said user input in said array of comments, thereby allowing newly added comments to be displayed when said third frame is displayed at a later time in a current tour or subsequent tour of the same web page URLs.

* * * * *